Jan. 24, 1950 H. L. KRAEFT ET AL 2,495,333

METHOD OF MANUFACTURING TUBULAR FRAME STRUCTURES

Original Filed Aug. 18, 1945 12 Sheets-Sheet 1

INVENTORS.
HERMAN L. KRAEFT
LEONARD J. WALTERS &
RUDOLPH F. SKERL
BY Fay, Golrick & Fay
Attorneys.

Jan. 24, 1950 H. L. KRAEFT ET AL 2,495,333

METHOD OF MANUFACTURING TUBULAR FRAME STRUCTURES

Original Filed Aug. 18, 1945 12 Sheets-Sheet 2

INVENTORS.
HERMAN L. KRAEFT
LEONARD J. WALTERS &
RUDOLPH F. SKERL
BY Fay, Golrick, & Fay
attorneys.

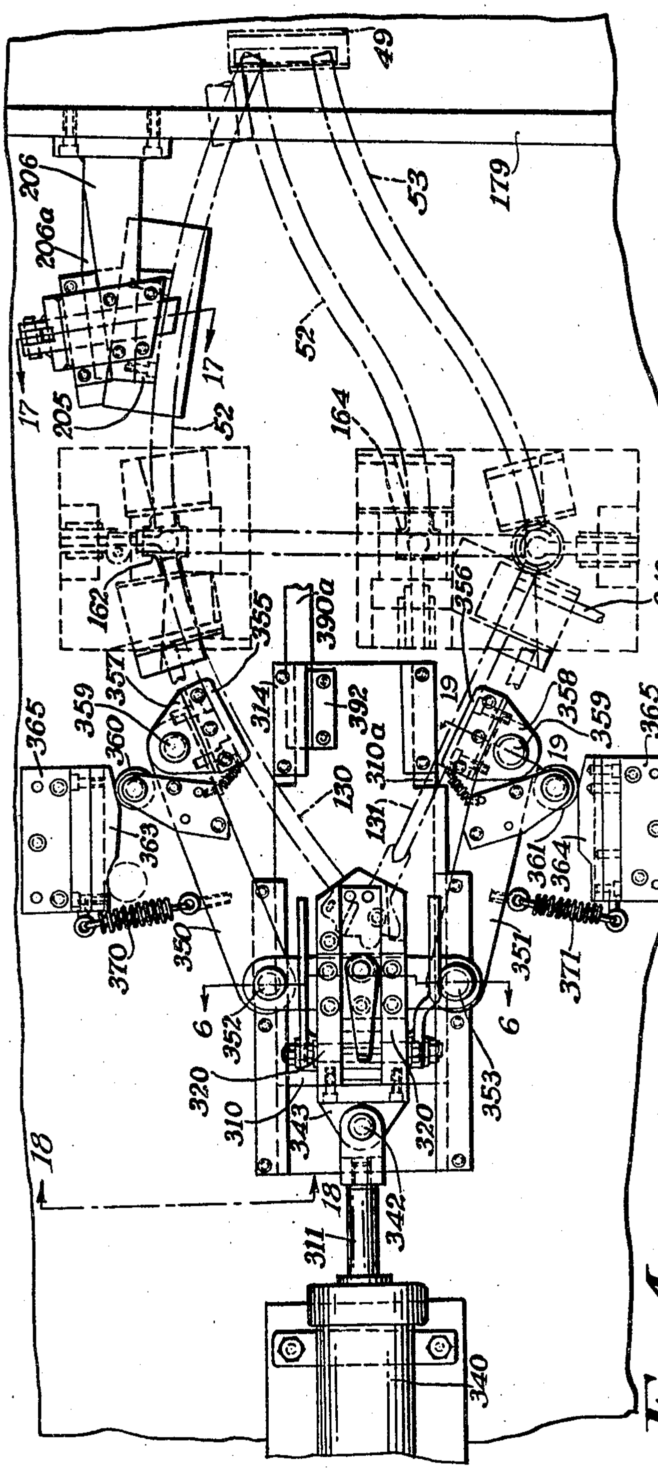
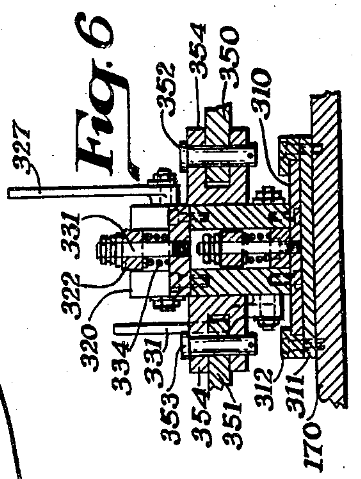
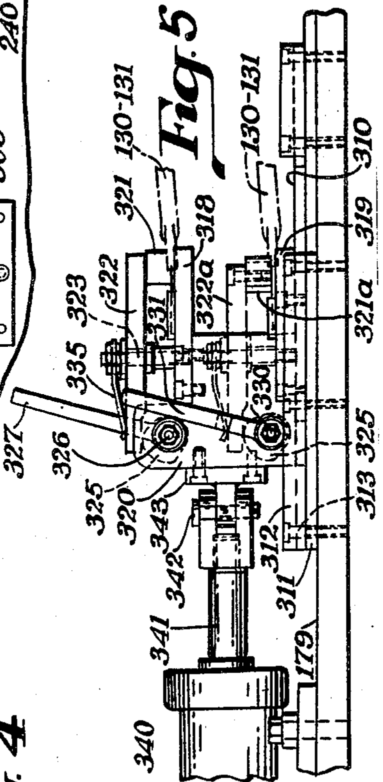
Fig. 6
Fig. 5
Fig. 4
INVENTORS.
HERMAN L. KRAEFT
LEONARD J. WALTERS &
RUDOLPH F. SKERL
BY Fay, Golrick, & Fay
attorneys.

INVENTORS.
HERMAN L. KRAEFT
LEONARD J. WALTERS &
RUDOLPH F. SKERL
BY Fay, Golrick, & Fay
attorneys

METHOD OF MANUFACTURING TUBULAR FRAME STRUCTURES

Original Filed Aug. 18, 1945 12 Sheets-Sheet 5

INVENTORS
HERMAN L. KRAEFT
LEONARD J. WALTERS &
RUDOLPH F. SKERL
By Fay, Golrick & Fay
attorneys

METHOD OF MANUFACTURING TUBULAR FRAME STRUCTURES

INVENTORS.
HERMAN L. KRAEFT
LEONARD J. WALTERS &
RUDOLPH F. SKERL
BY Fay, Golrick, & Fay
Attorneys.

METHOD OF MANUFACTURING TUBULAR FRAME STRUCTURES

Original Filed Aug. 18, 1945 12 Sheets-Sheet 7

INVENTORS
HERMAN L. KRAEFT
LEONARD J. WALTERS
RUDOLPH F. SKERL
By Fay, Golrick, & Fay
attorneys

METHOD OF MANUFACTURING TUBULAR FRAME STRUCTURES

Original Filed Aug. 18, 1945 12 Sheets-Sheet 8

INVENTORS.
HERMAN L. KRAEFT
LEONARD J. WALTERS &
RUDOLPH F. SKERL
BY Fay, Golrick & Fay
Attorneys.

INVENTORS
HERMAN L. KRAEFT
LEONARD J. WALTERS &
RUDOLPH F. SKERL
BY Fay, Golrick, & Fay
Attorneys INVENTORS
HERMAN L. KRAEFT
LEONARD J. WALTERS &
RUDOLPH F. SKERL
By Fay, Golrick, & Fay
attorneys INVENTORS
HERMAN L. KRAEFT
LEONARD J. WALTERS &
RUDOLPH F. SKERL
By Fay, Golrick, & Fay
attorneys INVENTORS
HERMAN L. KRAEFT
LEONARD J. WALTERS &
RUDOLPH F. SKERL
By Fay, Golrick, & Fay
attorneys Patented Jan. 24, 1950 2,495,333

UNITED STATES PATENT OFFICE 2,495,333

METHOD OF MANUFACTURING TUBULAR FRAME STRUCTURES

Herman L. Kraeft, Cleveland Heights, Leonard J. Walters, Shaker Heights, and Rudolph F. Skerl, Euclid, Ohio, assignors to The Murray-Ohio Manufacturing Company, Cleveland, Ohio, a corporation of Ohio Original application August 18, 1945, Serial No. 611,286. Divided and this application May 31, 1946, Serial No. 673,690

8 Claims. (Cl. 29—176)

This invention is directed to the manufacture of tubular frame structures such as velocipede frames and the particular disclosure herein set forth illustrates a novel method and an apparatus adapted to the fulfilling of several steps of the method of manufacturing bicycle frames. The present application is a division of our application Serial Number 611, 286, filed August 18, 1945.

In a prior Kraeft and Powers application Serial No. 513,163, now Patent No. 2,435,448, a bicycle frame is disclosed having such structural characteristics as to make feasible the pre-assembling of all of the elements or parts of the frame whereby a simultaneous copper brazing of all of the frame parts, including reinforcements, could be effected in a highly advantageous manner by heating the entire frame to a copper brazing temperature in a non-oxidizing environment. This resulted in the production of a strong frame of such external neatness and cleanness as to obviate the labor of trimming, grinding and filing of flashings or drippings unavoidably incurred in welding and brazing methods heretofore practiced in the velocipede frame manufacturing art. In said application the preconditioning of the pre-assembled frame joints to withstand the expansion of the frame parts when raised to a copper brazing temperature of from 2025° to 2080° F. without a resulting disruption of accurate relationship of the parts at the joints comprised a salient feature of the disclosed method.

Generally the method comprised effecting a close fitting of the parts at the joints and the preliminary maintenance of the joints by a temporary locking of the joined tubes through the use of spot welds or the like that would hold the assembled relationship of the inserted ends of the smaller tubes which had been close fitted into openings formed in the larger tubes. While the ultimate purpose was fulfilled, the joint spotting in some instances was awkward and uncertain in that occasionally spot weld failures would develop during the high temperature period of the brazing with a resulting slippage at one or more of the joints. Hence a certain percentage of the completed frames would have to be discarded since such a completed frame could not be salvaged.

The general object of the present invention is to simplify further and to improve the mode of assembly and the temporary bonding of the joints of the assembly whereby the entire frame assembly will remain so thoroughly locked that when the entire frame is heated to approximately 2000° F., practically no subsequent straightening of the frame elements is required.

Another object is to provide a pressure mode of joint forming preparatory to a copper brazing operation which eliminates the general need of a tube locking or a securing medium at each joint to maintain the inter-relationship of the joined tube members when expansion thereof takes place during the brazing operation.

A further object of the present invention is the provision of a novel method of simultaneously effecting a pressure assembly of several sub-assemblies comprising a tubular velocipede frame in such manner as to avoid the creation of troublesome localized stresses in the tubular elements which would cause warping in a subsequent simultaneous brazing operation.

A further object of the present invention is to provide a mode of effecting a press fitted pre-assembly of the various tubular elements comprising a bicycle frame whereby the over-all accuracy of the pre-assembly will be maintained without the use of heat consuming fixtures during a general brazing operation in which the entire frame is heated to temperatures of from 2025° to 2080° F. while standing in an upright position.

The present invention contemplates the use of an order of assembly of the various elements and parts comprising the velocipede frame whereby very substantial pressures can be utilized to effect very tight press fits of from .005 to .015. We have determined that severe press fits will eliminate all danger of a spreading or creeping of the frame parts relative to each other when heated throughout during a brazing temperature of over 2000° F. and without interfering with the capillary migration of the liquid copper. The pressures required to force the smaller tube ends into the openings formed in the walls of the larger tubular elements are quite substantial and, due to the fact that most of the reach bars comprising the frame are curvilinear in shape, the mode of supporting and conditioning the elements to receive such press fitting forces and the mode of force application is such that proper alignment of the interfitting press fitted parts can be maintained during this operation. The operation of internal stresses and strains which would become manifest in distortions and bad joints when released during the overall high temperature brazing operation is avoided.

Our method, which is here disclosed as applied to making bicycle frames, accordingly comprises the formation of four sub-assemblies of the elements which consist of the bicycle frame, to-wit;

the double walled head or front fork bearing housing tube having two non-parallel openings formed therein, and into which openings ends of curved upper and lower reach bars have been press fitted; the center or seat post mast tube assembly formed of a double walled hanger housing tube having four openings of different diameters formed in the double wall thereof with the center tube lower end press fitted into one of the openings and a branched seat post cluster member press fitting upon the outer surface of the center mast tube in a desired position, (dependent upon whether a girl's or boy's bicycle frame is to be produced); and two rear fork sub-assemblies, each consisting of an upper rear fork tubular member and a lower rear fork tubular member of curvilinear shape with one end of each tube flattened to be press fitted or otherwise secured to lugs or branches formed on rear axle plates or yokes. The various smaller tubes have reinforcing inserts assembled within the end portions thereof. In the drawings we have shown apparatus for effecting the various steps of the process herein claimed, the apparatus per se having been claimed in said application Serial No. 611,286.

In said annexed drawings:

Fig. 4 is a partial plan view, on an enlarged scale, of the mechanism shown in Fig. 3 to emphasize the mechanism for clamping, guiding and press fitting the two pairs of rear frame assemblies, each consisting of an upper fork tube, a lower fork tube and rear axle plate, to the center mast pre-assembly;

Fig. 5 is a partial side elevation of the mechanism shown in Fig. 4;

Fig. 6 is a cross-sectional elevation taken substantially along the line 6—6 of Fig. 4 through a sliding clamp fixture which carries the two rear axle plates and attached tubes in properly spaced relation;

Figure 3:
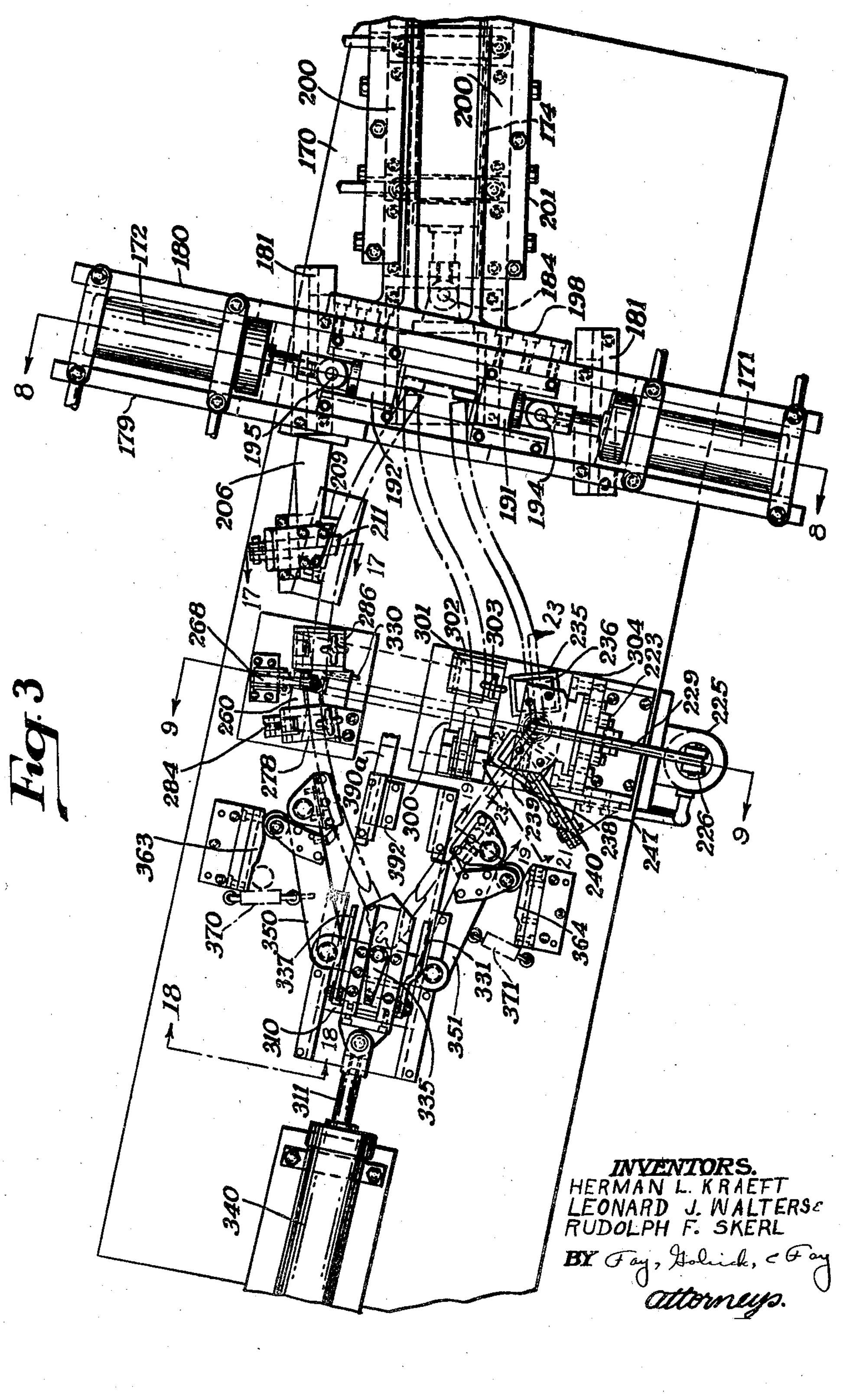
Fig. 3 is a top plan view of a machine for effecting the final assembly of the four pre-assemblies comprising the bicycle frames and as adapted to effecting such final assemblies of both boys' and girls' type of bicycle frames.
Figures 7, 8, 9:
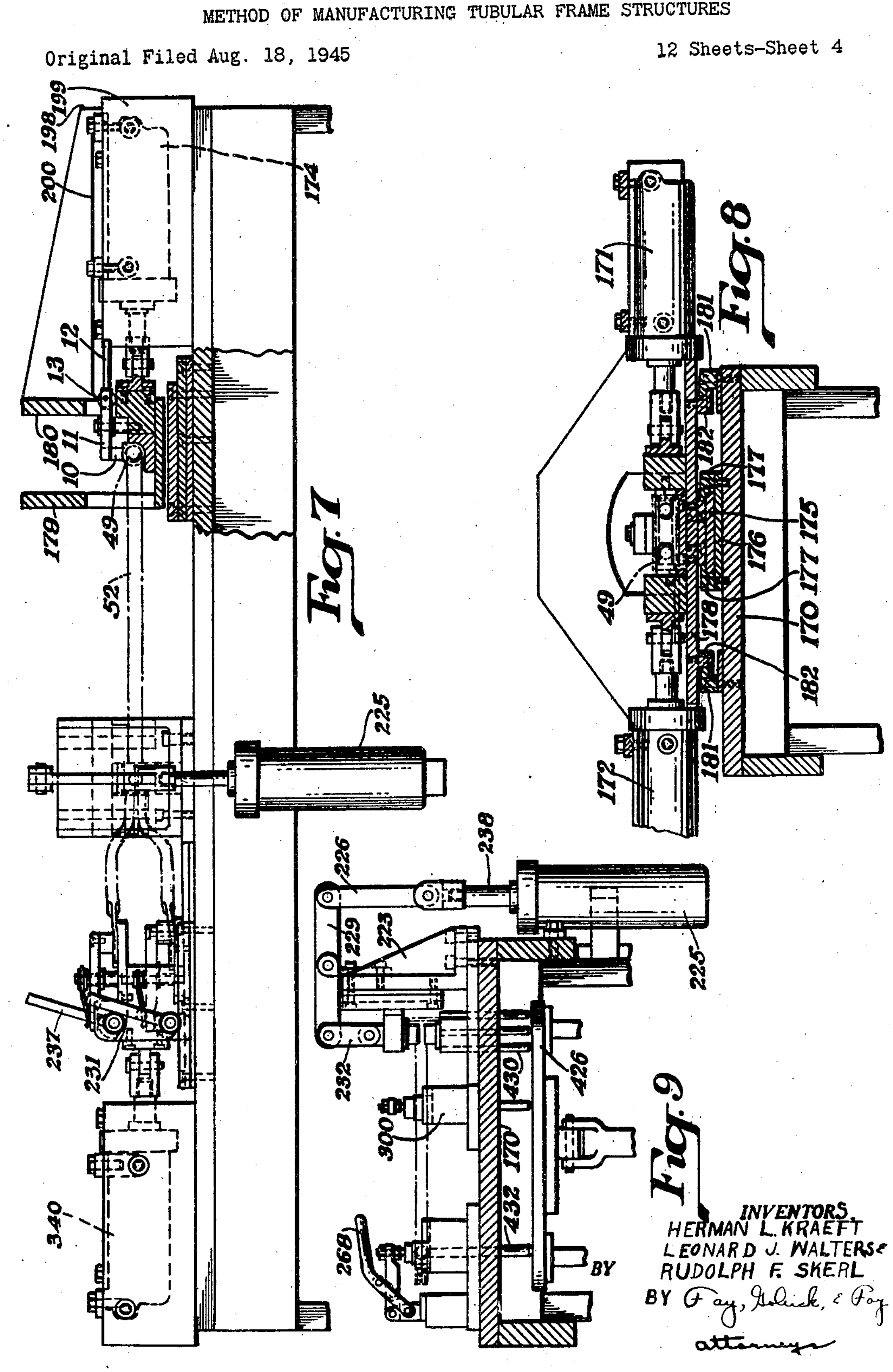
Fig. 7 is a side elevation of the final assembly machine shown in Fig. 3.
Fig. 8 is a cross-sectional elevation taken through the head tube or front bearing housing tube gauging and clamping mechanism and substantially along the line 8—8 of Fig. 3.
Fig. 9 is a cross-sectional elevation taken substantially along the line 9—9 of Fig. 3 through the center mast assembly gauging and clamping mechanism.
Figures 10, 11, 12:
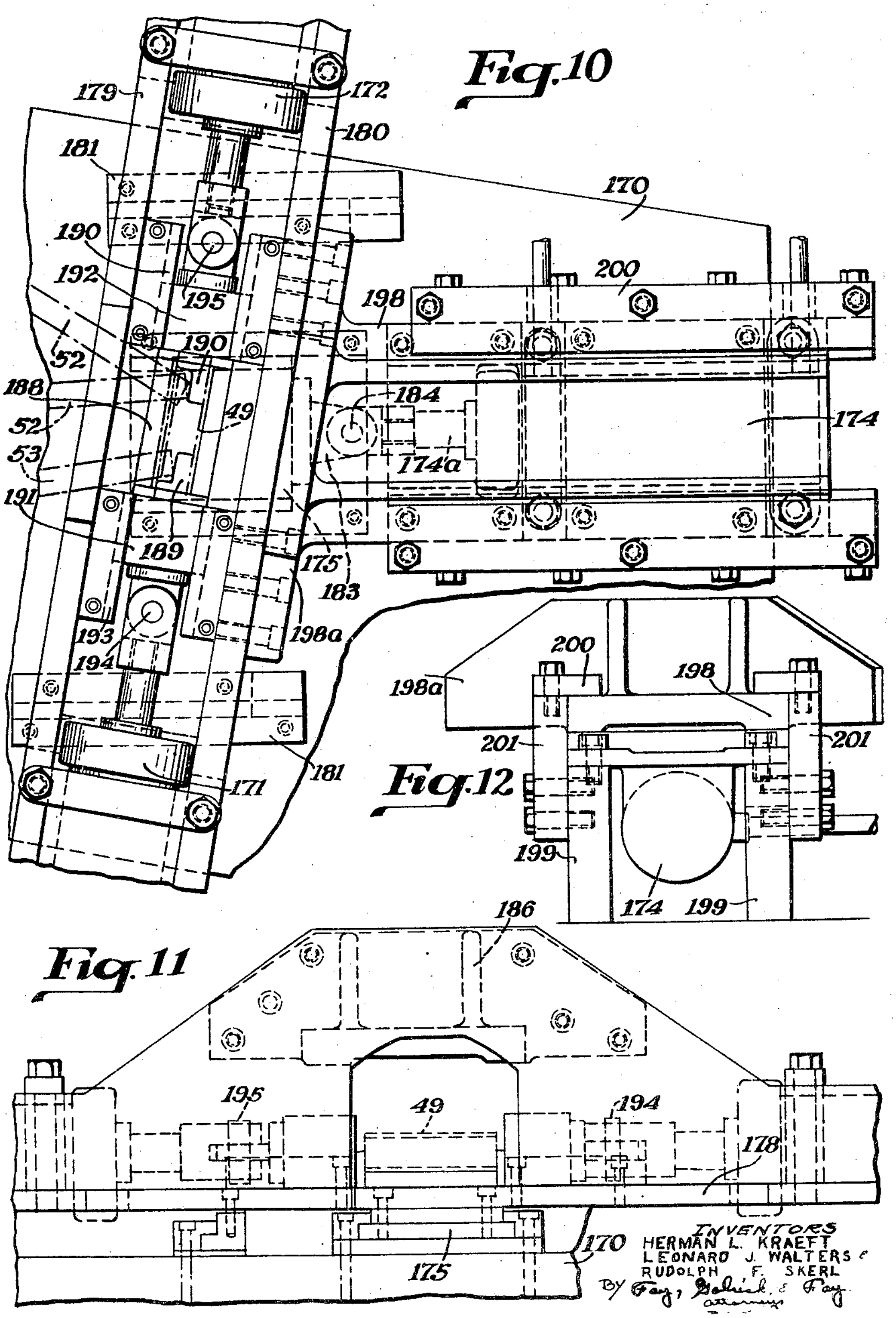
Figure 13:
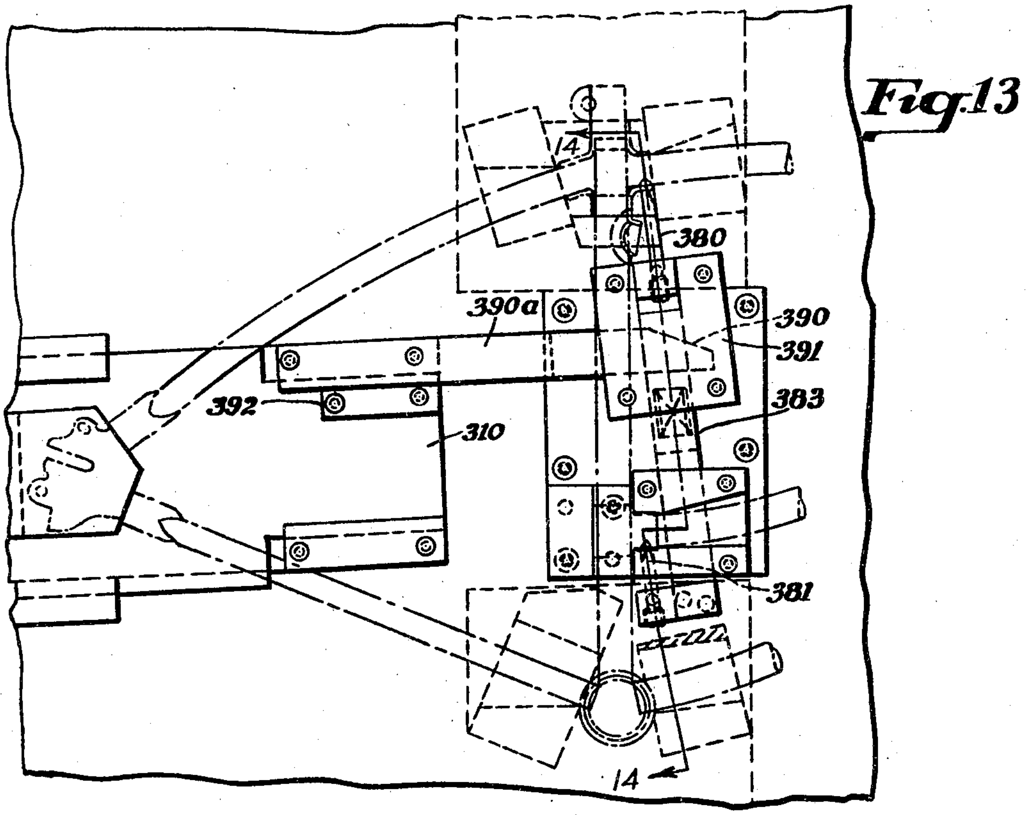
Figure 15:
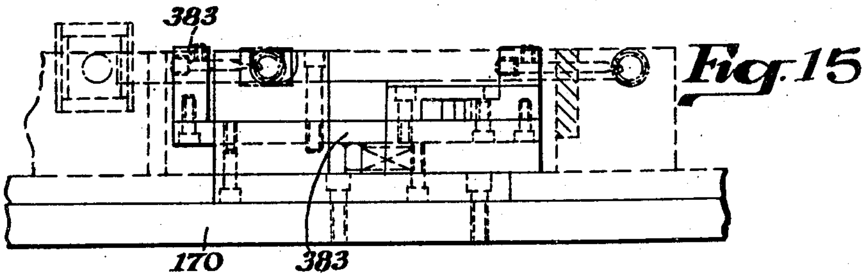
Figure 16:
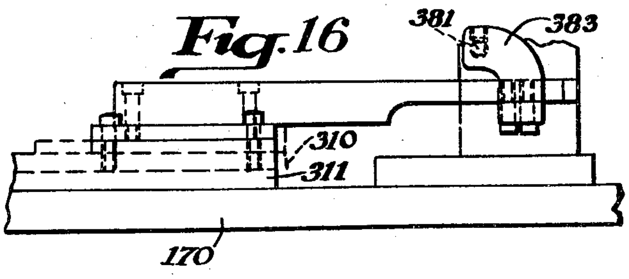
Figure 14:
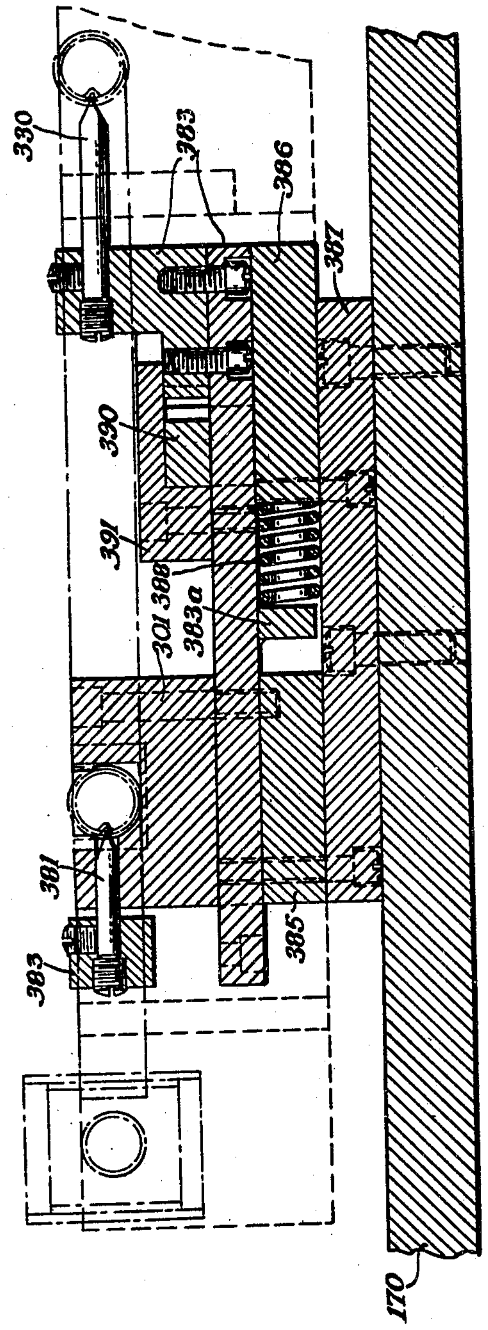
Figure 22:
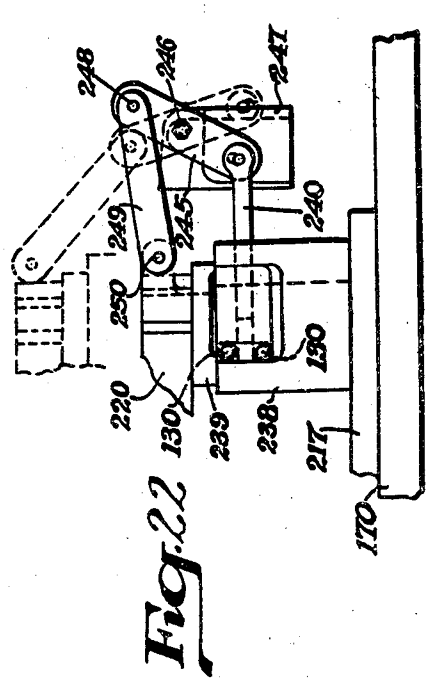
Figures 17, 18, 19, 20A, 20B:
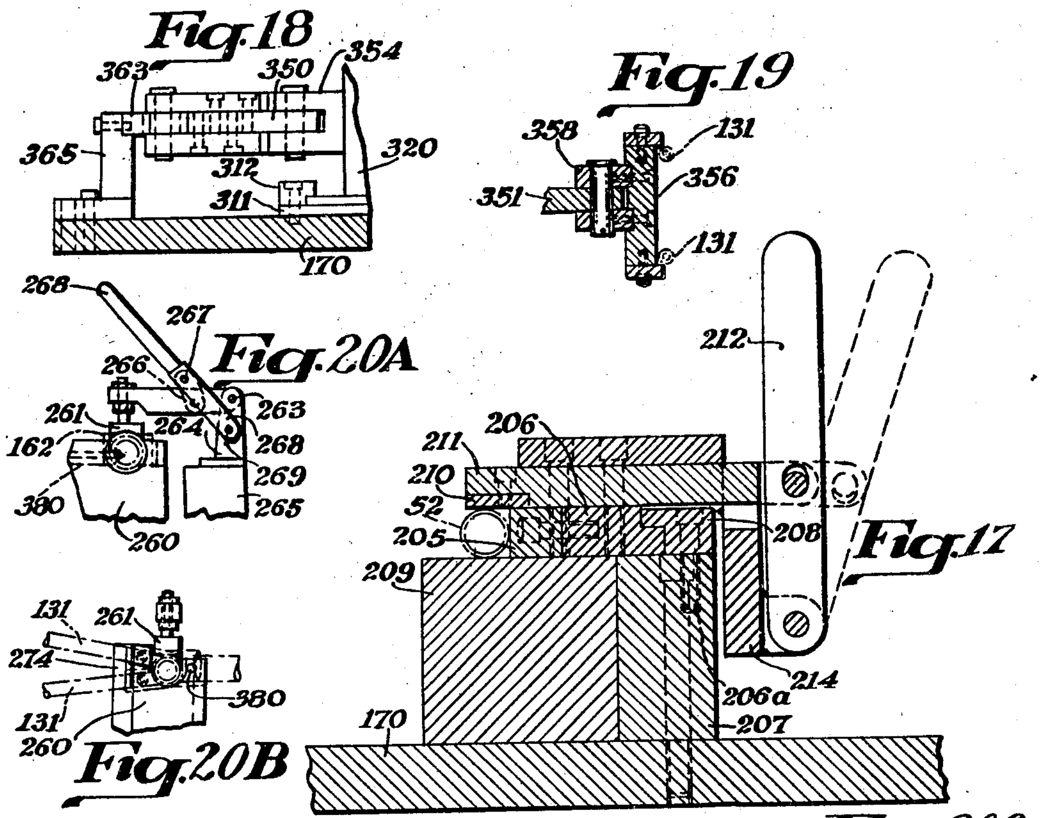
Figures 20, 20C, 20D:
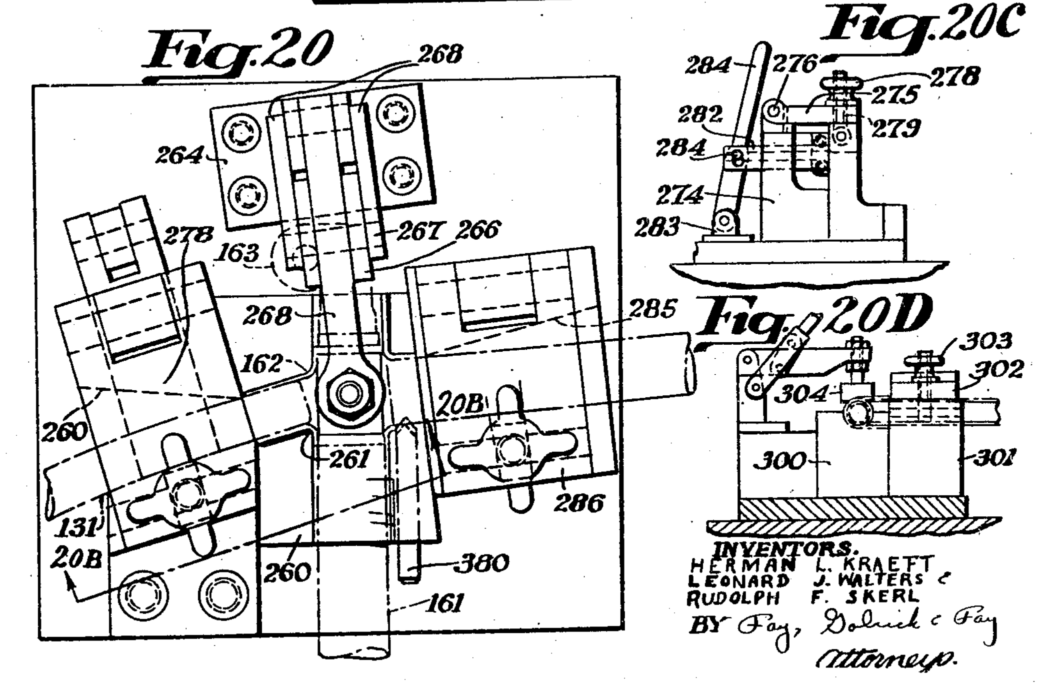
Figure 26:
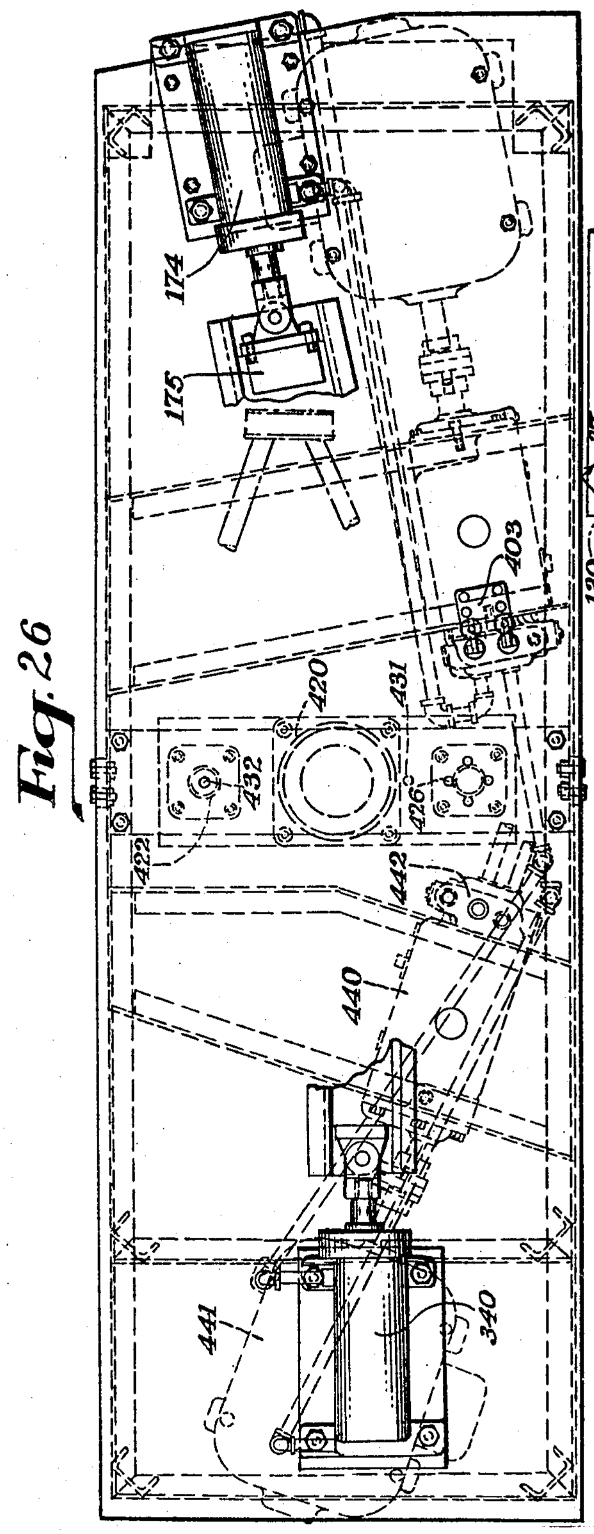
Figure 21:
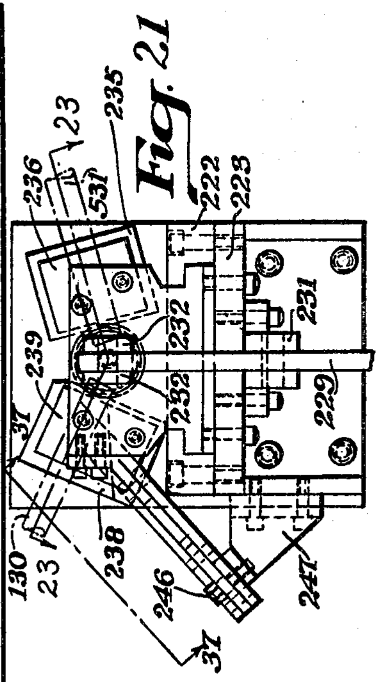
Figure 23:
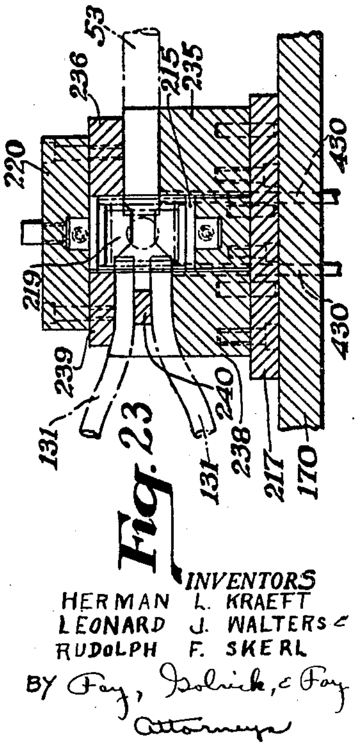
Figure 24:
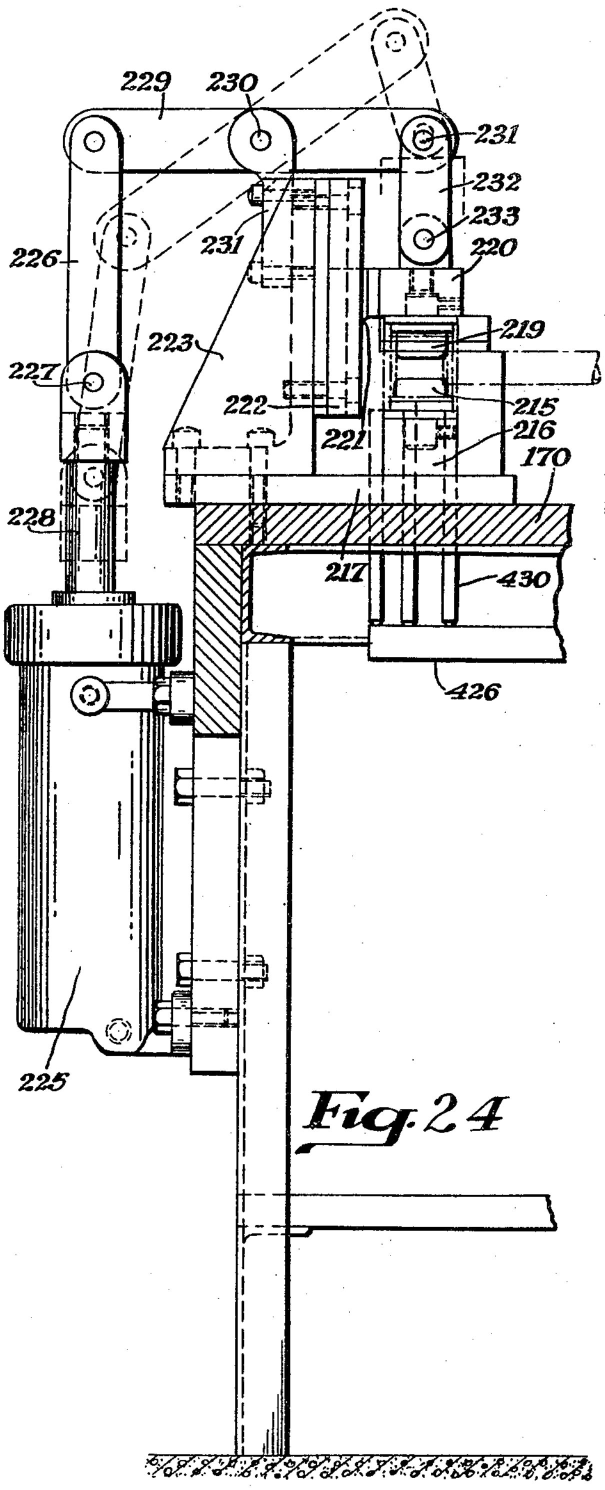
Figure 25:
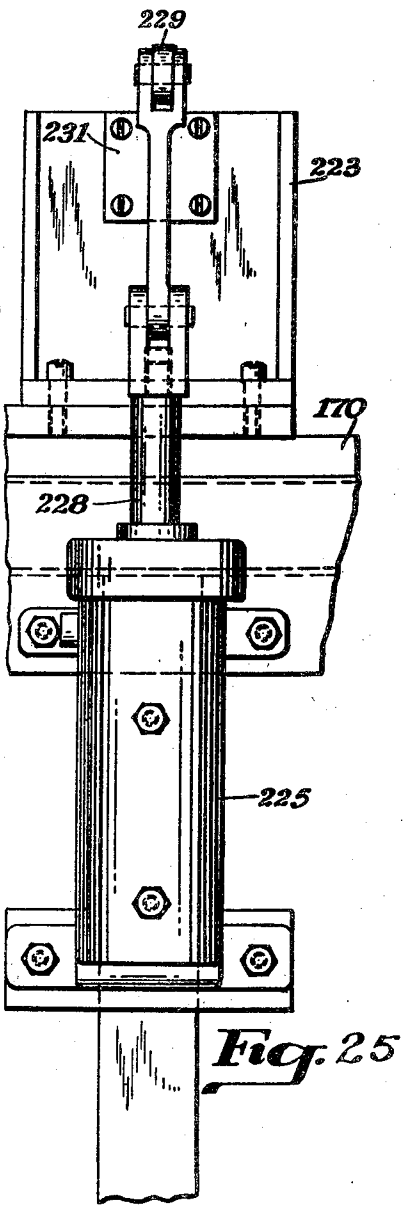
Figure 27:
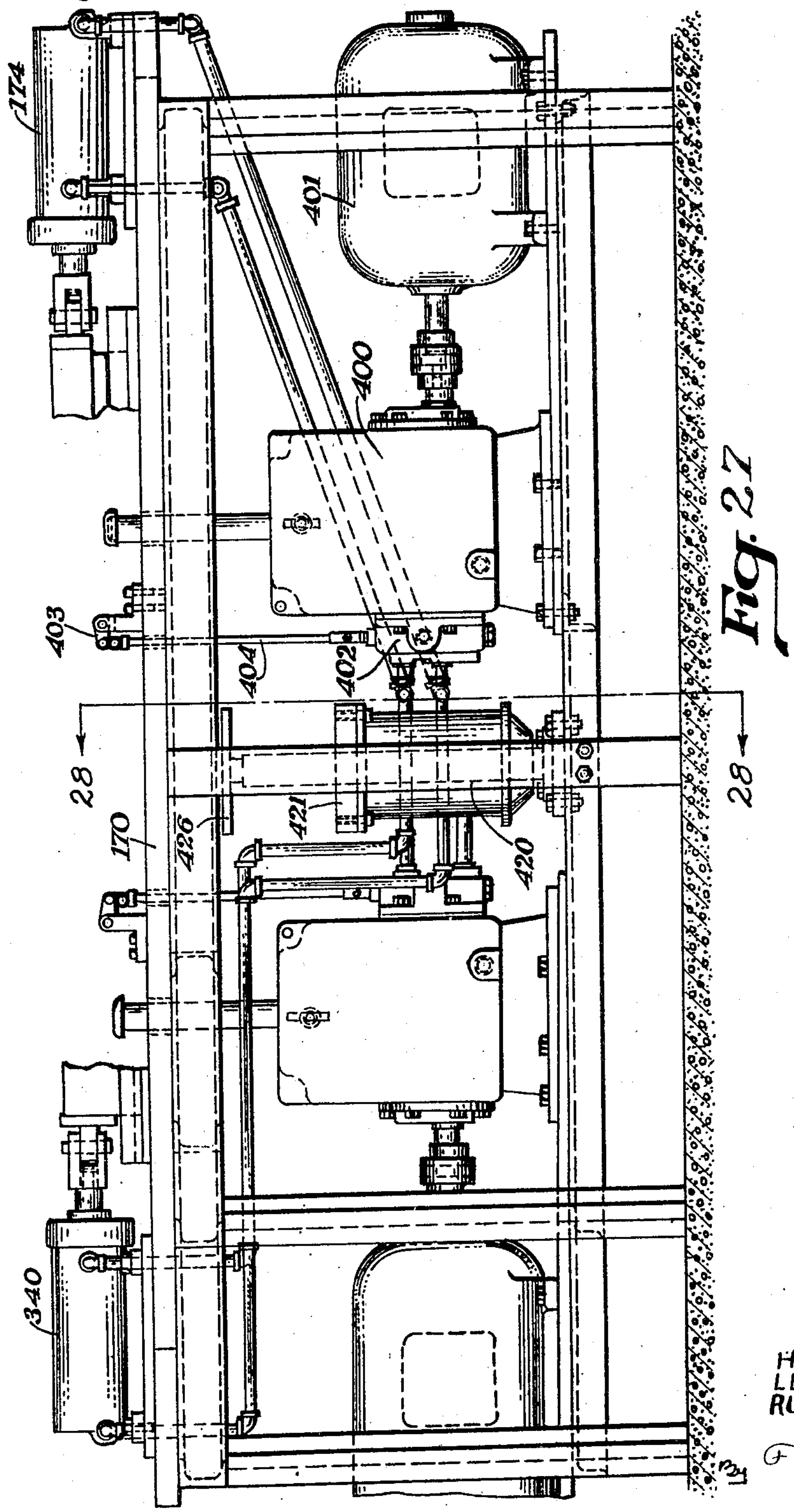
Figure 29:
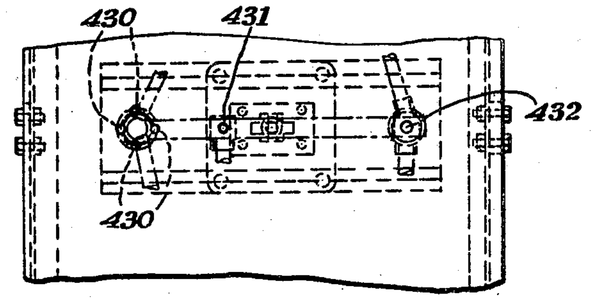
Figure 28:
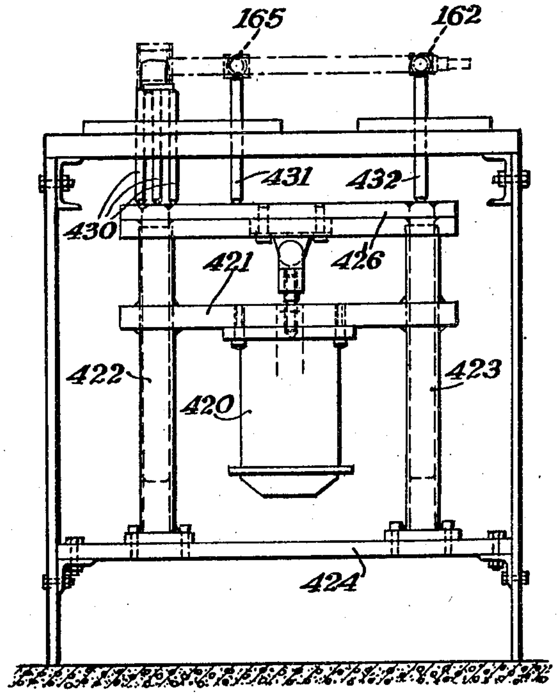

Fig. 10 comprises an enlargement of the front housing gauging and clamping mechanism shown in Fig. 3;

Fig. 11 is an elevational view of the gauging, clamping and slide mechanism as viewed from the left in Figs. 3 and 10;

Fig. 12 is a partial rear view of the structure shown in Fig. 11;

Fig. 13 is an enlarged plan view of part of the mechanism shown in Fig. 3 and comprising nibbing means for locking the upper front reach bar to the center mast cluster by a metal indenting operation and as adapted to such locking for both boys' and girls' type frame;

Fig. 14 is an enlarged cross-sectional elevation taken substantially along the line 14—14 of Fig. 13;

Fig. 15 is an elevational view similar to Fig. 14 on a smaller scale;

Fig. 16 is a side elevational view of a sliding cam mechanism for effecting actuation of the nibbing mechanism shown in Figs. 13, 14 and 15;

Fig. 17 is a cross-sectional elevation of the upper front reach bar or tube gauging and actuating means and taken substantially along the line 17—17 of Figs. 3 and 4;

Fig. 18 is a fragmentary cross-sectional view taken substantially along the line 18—18 of Fig. 4;

Fig. 19 is a fragmentary cross-sectional view taken substantially along the line 19—19 of Fig. 4;

Fig. 20 is an enlarged plan view of the seat post or center mast cluster clamping means and tubular guiding means for guiding the ends of the upper rear fork tubes and the rear ends of the upper reach bar tubes during the press fitting of the same to the center mast cluster assembly;

Fig. 20A is a side elevation of the center mast clamping mechanism as viewed from the right of Fig. 20;

Fig. 20B is an elevation of the rear upper fork tube guiding means as viewed from the position indicated by the line 20B—20B in Fig. 20;

Fig. 20C is a side elevational view of the means shown in Fig. 20B as viewed from the left of Fig. 20;

Fig. 20D is an elevational view of the girls' type cluster clamping and tube guiding means as viewed from a position indicated by the line 20D—20D in Fig. 3;

Fig. 21 is a plan view of the hanger housing gauging and clamping means shown in Fig. 3, but enlarged for the purpose of disclosure;

Fig. 22 is an elevational view of a part of the mechanism shown in Fig. 21 and as viewed from the direction indicated by the line 22—22 in Fig. 21;

Fig. 23 is a cross-sectional view of the hanger housing gauging and clamping means taken substantially along the irregular line 23—23 of Fig. 21;

Figs. 24 and 25 are enlarged elevational views of the hanger housing clamping mechanism to show the means for effecting the operation thereof;

Fig. 26 is a top plan view of the mechanism shown in Fig. 3 to illustrate the location of the hydraulic means for operating the various fixtures comprising the assembling machine;

Fig. 27 is a side elevational view of the hydraulic mechanism indicated in Fig. 26;

Fig. 28 is a cross-sectional elevation of the machine taken substantially along the line 28—28 of Fig. 27 to illustrate a knockout mechanism for extracting or elevating the completely assembled frame out of the machine; and Fig. 29 is a fragmentary end view of the knockout mechanism shown in Fig. 28.

Figure 1:
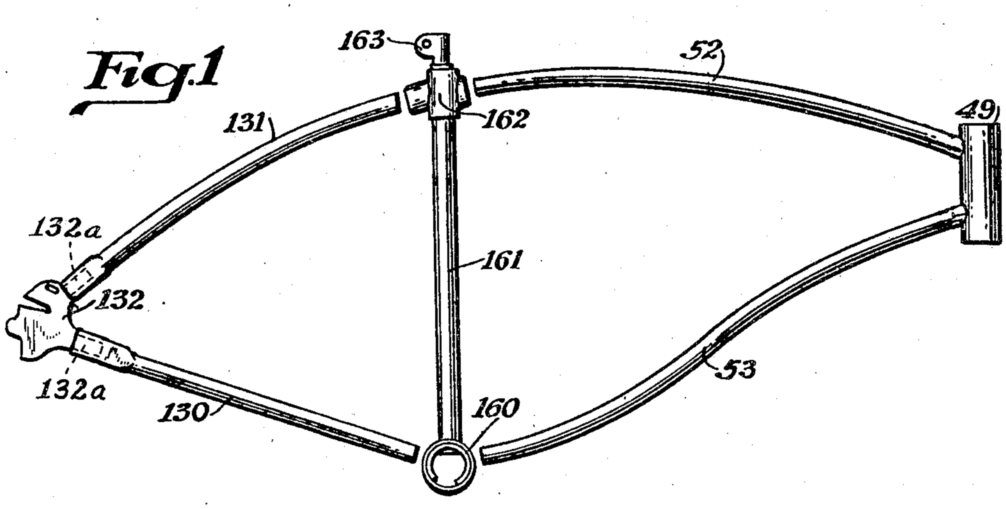
Fig. 1 is a diagrammatic representation of four pre-assemblies comprising a boy's type bicycle frame.
Figure 2:
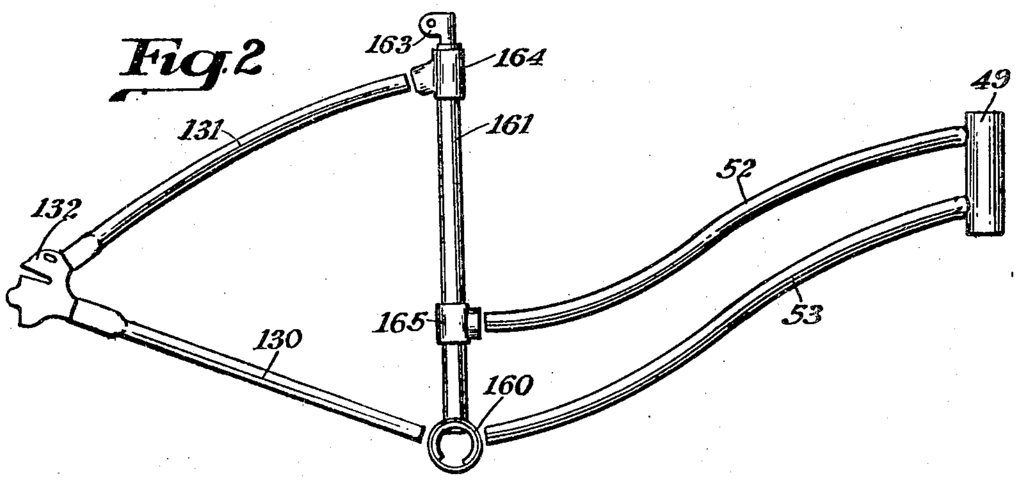
Fig. 2 is a diagrammatic representation of four pre-assemblies comprising a girl's type bicycle frame.

Figs. 1 and 2 comprise more or less diagrammatic representations of the pre-assemblies comprising a boys' and a girls' type bicycle frame. The manner of press fitting the elements of these sub-assemblies and the apparatus for effecting the same is disclosed in said application Serial No. 611,286. The front sub-assembly comprises front fork bearing tube 49, an upper reach bar 52 and lower reach bar 53 press fitted into openings in the large tube 49. The rear sub-assemblies comprise an upper rear fork tube 131 and a lower rear fork tube 130 secured and abutting to flat axle plate 132 press fitting on lugs 132*a* and 132*b*, there being a right and left-hand wishbone-like pre-assembly. The center mast comprises a separate sub-assembly with the elements press fitted together. This center mast assembly comprises a hanger housing tube 160, a main or center mast tube 161, a four-branch cluster or tube-joining means 162 and a seat post supporting tube 163, as shown in Fig. 16, for the boys' frame. In the girls' frame, in lieu of the cluster 162, there are two clusters 164 and 165. These various hollow members are press fitted by any suitable means to accurately form the tubular center mast pre-assembly structure illustrated.

The branched cluster 162 (see Fig. 1) may be press fitted along the mast tube to the desired position by a slidable clamping mechanism and the respective mechanisms may be effective to produce the center mast sub-assembly with the center line of the hanger housing properly disposed relative to the center lines of the branches of the cluster member. In the girls' type the two branch members 164 and 165 are similarly fitted.

The final assembly of the sub-assemblies above described is effected by fixedly supporting the center mast assembly through the use of a gauging means extending into both ends of the hanger housing and with associated clamping means and, further, by the use of clamping means which firmly engages the cluster portions of the center mast assembly. The front sub-assembly and the two rear sub-assemblies are then positioned with the free ends of the smaller tubular elements thereof substantially in alignment with the openings in the branches of the cluster member and the openings in the tubular wall of the hanger housing member. While maintaining this relationship, compression forces are applied to the head end of the front assembly and the rear ends or plates of the two rear fork assemblies so that the free ends of the smaller tubes of the respective assemblies are shifted toward each other and into the openings in the cluster and hanger housing. This operation is effected by applying forces in a general longitudinal direction relative to the smaller tubes of these assemblies in substantially precision relation to the respective openings into which they are to be press fitted. Means are provided for gauging the longitudinal movement of the ends of the smaller tubes after entrance thereof into the openings of the center mast assembly so that a proper relation of the smaller tube ends to the front housing, to the hanger housing, to the seat post cluster and to the rear axle plates may always be obtained regardless of variations in the resistance encountered at one tubular joining point relative to another. The result is an overall accuracy of the disposition of the hanger housing relative to the front housing or head and the rear axle plates without any undue localized strain of any of the tubular members and jointures comprising the preassembled frame. A final locking is effected between one or more of the front reach bar ends and the center mast cluster in addition to the press fitted connection therebetween. Mechanism for carrying out the above outlined method of final assembly comprises the hydraulically operated final assembling machine shown in Figs. 3–29 inclusive, of the drawings.

The final assembly machine for press fitting these four preliminary sub-assemblies together comprises a front gauging, clamping and guiding mechanism for the front sub-assembly, a gauging, guiding and clamping mechanism for the two rear sub-assemblies, and a gauging and clamping mechanism for rigidly positioning and holding the center mast pre-assembly. Hydraulic means is provided for effectively press fitting the six free ends of the tubular members, comprising the front and rear assemblies, into openings in the center mast assembly and means for separating the completely assembled frame from the mechanism after the frame has been press fitted and locked together, also is provided. The order of description of these various mechanisms will be followed hereinafter generally as outlined above. Associated with the respective slide mechanisms are cam operated tube stabilizers for preventing buckling or distortion of the curved tubes when longitudinal pressures are exerted thereon by the hydraulic means.

The front mechanism for receiving, gauging, clamping and shifting the front sub-assembly toward the fixed center mast assembly to press fit these two assemblies together is illustrated in Figs. 3, 7, 8, 10, 11, 12 and 17 of the drawings. This mechanism comprises slide structures operatively supported upon a heavy plate 170, forming the table or bed of the machine, and a supporting framework for the table is indicated generally in the drawings. The front slide mechanism supports two oppositely disposed pneumatic or hydraulic piston cylinder mechanisms 171 and 172 which operate oppositely disposed gauging plugs that fit into the open ends of the head or front housing tube 49. The slide mechanism, including the pneumatic or hydraulic cylinders 171 and 172 is shifted or operated as a unit by a hydraulic cylinder mechanism 174 and the controls therefor may be conveniently located on the top of bed 170. In Figs. 8, 10, 11 and 12 the slide mechanism is shown as comprising a main slide structure 175, a base plate 176 supported by the table 170, slideways 177 and a carriage plate 178 secured to the slide structure. The carriage plate is reinforced to obtain stiffness by two spaced apart truss members 179 and 180, to which the hydraulic cylinders 171 and 172 are attached and disposed therebetween. Carriage plate 178 is provided with a further slideway structure comprising slide gibs 181 secured to the table 170 of the machine and which slidably engage stabilizer slide members 182 secured to the under side of plate 178 in operative relation to the members 181. The hydraulic piston cylinder mechanism 174 has a connecting rod 174*a* thereof connected to the slide structure 175 by a bracket 183 and a pin 184 extending through the bracket and a yoke-formed end of the piston rod 174*a*.

A third slide structure is provided comprising the slide member 198 placed above the plate of the table and operating upon blocks 199, which also form a support for the hydraulic cylinder mechanism 174 disposed therebetween. Gibs 200 are secured to the members 199 to complete the slideway structure. The forward end of the slide 198 comprises an integral bracket formation 198*a* which abuts and is secured to the truss member 180. The central region of the truss members is cut away, as shown in Fig. 11, to afford visibility and access to the operating position of a cradle member 188 secured to the carriage plate 178 and which is channeled to receive the front housing 49 and attached tubes, 51—53. The channel formation will vary for a boy's type or girl's type frame.

Retractable gauging plugs 189 and 190 are carcarried by slide members 191 and 192, respectively, and which operate in slideways 193 and 194 disposed at opposite ends of the cradle member 188. The shapes of the gauging plugs 189 and 190 are such as to engage the ends of the head tube 49 to center it and also to serve as stops for limiting the inward movement of the ends of the reach bar tubes 52 and 53 when pressure is exerted generally longitudinally upon the tubes. Slide members 191 and 192, carrying these gauging plugs, may be connected to the hydraulic connecting mechanisms 171 and 172 by any convenient means, such as pivotal pin connections 194–195 respectively. In Fig. 10 the adaptation of the mechanism described for both boys' and girls' type frame of assembly is indicated by the dot and dash lines and reference numerals 52 and 53. It will be seen that the mechanism above described comprises in effect four slide structures which afford very substantial operative stability to the mechanism or fixture for clamping, gauging and shifting the front sub-assembly of the frame into press fitting relation to the center mast assembly.

Associated with the slide mechanism described and immediately adjacent tube 52 (boys' type), is a tube guiding and stabilizing means disposed to react longitudinally along the curved upper reach bar 52 whereby the reach bar will be prevented from being distorted under the press fitting forces required to effect the press fitting assembly. This mechanism is shown in Figs. 4 and 17 and comprises a shiftable shoe member 205 having a vertically extending surface to tangentially conform substantially to the curved shape of the upper reach bar 52. This shoe member is carried by an arm or bracket 206 secured to the forward truss member 179. The bracket 206 is provided with a slide formation 206a which is supported by a base block 207 secured to the table 170 of the machine and the slide reacts against a slide gib 208 carried by the block 207. A fixed block 209 serves to support the under side of the reach bar tube 52. The top region of the tube is stabilized by a retractable bearing member 210 carried by a slide bar 211, shiftable into and out of operative position by a manually operated lever 212. The lever 212 is pivotally mounted on a pin 213 carried by a bracket structure 214 secured to the block structure 207—209. Thus, as the front sub-assembly is shifted toward the center mast assembly and under compressive stresses, tube 52 is supported along its path of movement along three lines about 90° apart. When it is desired to remove the completed frame from the machine the upper bearing or thrust member 210 can be retracted out of the way of operation of the lever 212 in an obvious manner.

The means for gauging the center mast assembly in the machine comprises a pneumatically or hydraulically operated gauging plug 219 adapted to fit into the upper open end of the housing tube 160 and cooperate with a second gauging plug 215 secured to the table. Gauging means are associated with the hanger housing clamping means for guiding the free ends of the two lower rear fork tubes to openings in the hanger housing and also for guiding the lower free end of the front reach bar 53 to a corresponding opening formed in the hanger housing. This center mast holding mechanism also includes a gauging and clamping means for clamping the cluster structure 162 of the center mast assembly, in the case of a boys' bicycle frame, and the cluster structures 164 and 165 in the case of a girls' type frame. Associated with the upper cluster clamping means is a removable spacing bar insertable between and retractable from a position between the two upper rear fork members. A similar mechanism acts between the two lower rear fork tubes. All of these mechanisms are such as to be swung or shifted clear of the completed frame for the ready extraction of the frame from the machine when the press fitted assembly has been completed. The mechanism for gauging and clamping the hanger housing is best shown in Figs. 1, 9, 21, 22, 23, 24 and 25.

With reference to Fig. 24, the bottom gauging plug 215 is shown supported by a block member 216 secured to a plate 217 supported upon the top surface of the machine table 170. The upper gauging plug 219 is mounted upon a shiftable block 220 secured to a slide 221 operated in a slideway structure 222 formed on a vertically extending bracket 223 secured to plate member 217. The slide structure 220—221 and the upper gauging plug 219, operatively supported thereby, is actuated by a pneumatic or hydraulic piston-cylinder mechanism 225 through a link member 226 pivotally connected by pin 227 to the piston rod 228. The link 226 operates a lever member 229 which is pivotally supported at 230 by a bracket member 231 mounted on the upper part of the slide bracket 223. The inner end of lever member 229 is pivotally connected at 231 to link member 232 which is pivotally connected at 233 to the slide block 220. The cylinder 225 may be attached to the side of the machine frame in any convenient manner and the controls therefor may be conveniently located on bed 170. The formation of the gauging plugs 215—219 are such that the inserted parts thereof serve as stops for the ends of the tubular members being forced into the hanger housing. Upon completion of the assembly the upper gauging plug 219 may be shifted upwardly a substantial distance by operation of the hydraulic mechanism described to permit upward shifting of the hanger housing and the associated press fitted tubing for the purpose of ready removal of the frame from the machine. Associated with the mounting for the lower gauging plug 215 are extracting or stripper pins 430 and the manner of operation thereof will be described hereinafter.

Associated with the hanger housing gauging and clamping means is a guide block 235 secured to the plate member 217 which has a channel formed therein for the purpose of guiding the free end of the lower reach bar 53 into the corresponding opening formed in the hanger housing tube 49. This channel formation is closed by a pad 236 mounted on or comprising a part of the slide block 222. A similar guide block 238 is disposed on the opposite side of the hanger housing position, note Figs. 21 and 23, and is provided with a channel shaped guideway to generally conform to the shape of the lower rear fork tubes 130. A shaped pad 239 carried by the slide block 220 serves to close the channel. A retractable positioning and gauging bar 240 operates in an opening formed in the block 238 to gauge the spacing between the fork tube ends 130 when being pressed into the hanger housing openings. The bar 240 may be operated manually. Pad 239, also carried by slide mechanism 220, closes the channel in block 238. The bar 240 (see Fig. 22) may also be operated by a link mechanism comprising a lever member 245 pivotally mounted at 246 on a bracket 247 secured to mast slide bracket 223. Lever 245 is pivotally connected at 248 to a link member 249 pivotally connected at 250 at its opposite end to the slide formation 220. Upward movement of the slide 220 causes the link mechanism to be shifted to the dotted line position shown in Fig. 22, effecting retraction of the bar 240 from between the lower rear fork tubes 130.

The means for gauging the upper portion of the center mast assembly is best shown in Figs. 3, 4, 20, 20A, 20B and 20 C. Referring to Fig. 20, a gauging block 260 is provided with gauging channels conforming in shape to the external surfaces of the cluster structure 162 for both boys' and girls' type of frame. This mechanism has associated therewith a nibbing means somewhat in the form of a center punch mechanism for indenting a branch wall of the cluster and the inserted end of the upper front reach bar tube, as will be more fully set forth. This nibbing mechanism is duplicated at a second center mast cluster position for the girls' type of frame and a common actuating means is provided for operating both punches. A second or intermediate cluster clamping means is provided on the machine for receiving and clamping the second cluster of the girls' type of frame.

Again referring to Figs. 20, 20A and 20B, it will be noted that the block 260 has associated therewith an adjustable clamping pad 261 carried on an arm 262 which is pivotally supported at 263 by a bracket 264 secured to a spacer block 265 supported by the table 170 of the machine. The arm 260 is connected intermediate its ends to a link 266 pivoted at 267 to an over-center swinging lever member 268 pivotally connected at 269 to the bracket 264. This clamping means is swingable upwardly and outwardly away from the frame cluster so that the assembled frame may be readily removed from the machine and the disposition is such that the clamping pad 261 will clamp the cluster 162 firmly in the channel formation of the block 260. Associated with the cluster clamping mechanism just described are right and left-hand tube guiding means comprising channeled blocks for guiding the free ends of the two upper rear fork tubes 131 and the free end of the upper front reach bar tube 52 into the respective branches of the closure structure 162. In Fig. 20B, block 273 is shown as being provided with a channel 274 shaped to receive and guide the upper rear fork tubes 131 to the two receiving branches of the cluster 162. This channel is closed at the top by a shiftable plate 275 bifurcated at one side and hinged at 276 to a lug 277 formed on the block 275. Opposite to the hinge structure 276—277, as viewed in Fig. 20, is a swingable locking knob 278 in threaded engagement with a swingable stud 279 pivotally connected to the block 274 which swings into and out of a slot 280 formed in an end of the plate 275. Thus, the plate 275 can be swung about hinge 276 upwardly and outwardly to permit removal of the assembled frame.

Associated with the guide block 275 is a retractable spacer bar 282 (see Fig. 20C), which is disposed to slide in an opening formed in the block 274 and have the tapered or wedge shaped inner end thereof extend between the ends of the two fork tube members 131 and thereby accurately determine the spacing therebetween at the time the tubes are being press fitted into their respective branches of the cluster structure 162. Bar 282 may be shifted inwardly and outwardly in any convenient manner, such as by a manually operated lever 284 pivotally supported by a bracket 283, the end of the bar 282 being bifurcated to afford a pin connection between the bar 282 and the lever 284.

For guiding the free end of the upper front reach bar, a channel block 285 is provided, which channel is closed by swingable plate 286 after the manner of operation of the plate 275 for completing the guiding means for the upper front reach bar tube 52.

For the girls' type frame a second mast cluster clamping means and a tube guiding means are provided, generally indicated by the reference numeral 300 in Fig. 3, for clamping the second cluster structure and upper front reach bar, and the construction thereof may be generally as above described with reference to the clamping member 261 and front reach bar guiding means 285—286. The mechanism 300 comprises generally a channeled block 301, hinged plate 302 and manual locking knob 303. Disposed forwardly of the center mast tube position is a cluster clamping member 304 which may be operated in the manner of the clamping member 261.

The mechanism for receiving, supporting and forcefully shifting the two rear fork assemblies comprises generally clamping means separately engaging each of the rear axle plates of the two rear sub-assemblies. These clamping mechanisms are carried on a hydraulically shiftable slide mechanism. The slide mechanism carries tube supporting and guiding arms pivotally connected with the slide mechanism and controlled in their tube guiding movements by cam members fixed to the table of the machine. This mechanism is shown in Figs. 4, 5, 6, 18 and 19.

In Figs. 4 and 5 a main slide member 310 is shown as being operable in a slideway structure comprising a bottom plate 311 and slideway gibs 312 secured to the bed 170 by bolts 313. The forward end 310*a* of the slide structure is narrowed to have a stabilizing slide formation operable in slideways or gibs 314 secured to the plate 311 and the machine table by bolts 350. The slide member 310 carries clamping anvils or clamping block mechanism comprising an upper gauging and clamp plate 318 and a lower gauging and clamp plate 319. The upper surfaces of these plates are contoured or recessed to conform generally to the edge contour of the rear axle plates 132. The upper plate 318 is supported in spaced relation to the lower plate 319 by a bracket structure comprising two spaced members 320. The upper surfaces of these clamp plates 318 and 319 are disposed in planes located substantially equidistantly above and below the common plane of the center lines of the center mast assembly and the tubes of the front sub-assembly when present in the machine. An upper locking or clamping member 321 is supported by an arm 322 in clamping relation to the upper plate 132 and is rockably carried on a bolt or stud member 323 supported by the clamping plate 318. The clamping lever 322 is operated by a cam member 325 fixed to a stud shaft 326 journalled in the bracket members 320. Also fixed to the stud shaft 326 is a manually operated lever 327 whereby when cam 325 is caused to wedge up against the under side of the clamping lever 322 an effective clamping of the rear axle plate and associated tubing by the clamping member 321 is obtained. A lower stud shaft 330 and manually operated lever 331 comprises a duplication of the upper clamping means just described. Operation of a lower clamping member 321a upon the lower axle plate 132 and associated tube assembly completes the alignment of the two rear axle plates. It will be noted that the bracket plates 320 serve as guiding means for the two rockable clamping levers 322 and 322a, which are urged normally upwardly by spring members 334. Leaf spring members 335 tend to cant the clamping levers 322—322a when the cam members 325 are swung to a lowered position, thus affording considerable clearance between the clamping blocks 321 and 321a and the respective gauging plates 318—319 for removal of the frame when completed. To operate the slide 310 a hydraulic piston-cylinder arrangement 340 is provided which may be secured to the top of the table bed 170 of the machine and the piston rod 341 thereof is pivotally connected at 342 to a bracket 343 secured to and spanning the ends of the bracket members 320.

Referring particularly to Figs. 4, 6, 18 and 19, it will be seen that means, carried by the slide mechanism 310, is provided for the supporting and the guiding of the two pairs of rear fork members or tubes in addition to the clamping and gauging mechanism. This tube guiding means comprises levers 350 and 351 pivotally supported at 352 and 353 at the sides of the bracket plates 320 by bracket members 354 and located substantially equidistant between the clamping surfaces of the clamping plates 318—319. Lever members 350—351 carry guiding shoes 355—356, which are shaped to embrace the upper and lower fork tubes and determine the outward spacing of the tubes. These shoes are carried by rockable brackets 357 and 358, respectively, on pivot pins 359 carried by the free ends of the lever members 350—351. Mounted upon the lever members 350—351, between the outer free ends thereof, are cam rollers 360 and 361, respectively. These cam rollers ride upon cam members 363—364, supported by bracket structures 365 secured to the table top 170 of the machine. Spring member 370 is attached to the bracket structure 365 and to the lever 350 to maintain the lever 350 with the roller 360 in contact with the cam at all times. A like spring 371 maintains roller 361 in contact with cam 364.

It will be seen that the mechanism just described is adaptable for the reception, gauging, clamping and movement of the two rear fork assemblies, each comprising an upper and a lower rear fork member previously press fitted to a rear axle plate. The shapes of the cams 363 and 364 are so arranged as to cause the shoe members 355, 356 to firmly support the upper and lower spaced apart fork tubes as the ends of these tubes are being moved along and through the channels formed in the guide blocks 236, 273 so that sidewise deflection of the tube members is prevented during the press fitting operation of the tube ends into the cluster structures and the hanger housing openings of the center mast cluster assembly.

It will be noted that the channels of the various tube end guiding mechanisms are shaped to converge precisely to the six respective socket openings of the rigidly held center mast assembly and that the tube ends regardless of their particular direction of movement by the slide movements, must follow the center lines of the sockets or openings during the press fitting action.

In Figs. 13, 14, 15 and 16 the means for effecting a locking together of the upper front reach bar tube and a branch of the center mass cluster assembly is shown. This mechanism comprises nibbing punches 380—381, the tool 380 being effective during assembly of the boys' type frame, while the tool 381 is effective during assembly of the girls' type frame. These tools are disposed to extend through openings formed in the guide blocks 260 and 301 and are blunt pointed to nib or distort and indent a portion of the wall of a branch of the cluster into the wall of the end of the front reach bar tube in both the boys' and girls' type of frame. The tools 380—381 may be carried by a slide member 383 and the slide member 383 comprises a built-up structure operable in slideway members 385—386, supported by a spacer plate 387 which rests upon the machine bed plate 170. Disposed between the slideway members 385—386 is a compression spring 388 disposed to react against a lug 383a depending from the slide 383, the other end of the spring abutting the slideway 386. The spring serves to shift the slide and the nibbing tools carried thereby away from the frame clusters. The slide 383 is operated in a work performing direction by a cam 390, held in position relative to the slide structure by an L-shaped slideway member 391, which is secured to the spacer block 387 on opposite sides of the slideway structure for the slide 383. Cam 390 comprises a bar formation 390a extending toward, and secured to, the slide 310 which carries the rear fork clamping mechanisms. A bracket 392 on the slide member 310 affords rigid connection between slide 310 and cam 390a. It will be seen that the nibbing or locking action of the tools 380—381 will be effected during the latter part of the forward movement of the slide 310, the front edges of the frame having been moved partially into press fitting engagement with the center mast cluster structures and hanger housing prior to the completion of this last mentioned operation.

In Figs. 26 and 27 a source of hydraulic power for operating the various systems hereinbefore referred to is generally shown as comprising a hydraulic pump and fluid reservoir mechanism, indicated by the reference numeral 400, the pump being driven by a motor 401. A valving mechanism, generally indicated by the reference numeral 402, is operated by the controller mechanism generally indicated by the reference numeral 403, positioned on the top of the machine bed 170, there being controller rods 404 extending downwardly to the valve mechanisms 402 whereby hydraulic pressure may be transmitted from the pump to hydraulic cylinder 174 and cylinder 340 in the sequence named and in sequential relation with the various manual operations hereinbefore described. There are two controller rods, each one operating a reversible valve mechanism so that hydraulic pressure may be used to operate the piston-cylinder mechanisms 174 and 340 in both directions.

In Fig. 26 a second hydraulic unit 440 is indicated as being driven by a second motor 441, there being the valving mechanism 442 controlled in the manner hereinbefore described with reference to valving mechanism 403. This hydraulic unit may be connected to piston-cylinder mechanisms 171, 172 and 225 for operating the front head and hanger housing tube gauging and clamping mechanisms in an obvious manner (not shown).

The mechanism for stripping the assembled frame from the machine and the various clamping and gauging fixtures thereof comprises a piston-cylinder mechanism 420 (see Figs. 28 and 29), supported by a beam member 421, which beam member is secured to hollow columns 422—423. These columns rest upon and are secured to a cross-structure 424 forming part of the machine frame. The piston rod of the piston-cylinder mechanism 420 is connected to an elevatable plate structure 426, upon which rest pin members located immediately beneath the hanger housing perimeter and the center mast cluster structure positioned in the machine. The pins extend through the various clamping mechanisms acting upon these parts of the bicycle frame. For example, disposed immediately beneath the lower perimeter of the hanger housing tube are four pin members 430 equi-angularly spaced and of such lengths as to extend upwardly through the lower part of the hanger housing clamping mechanism to engage the lower edge or perimeter of the housing tube. A pin 431 is likewise provided to extend upwardly and terminate immediately beneath the cluster structure 165 of the girls' type frame and pin 432 is similarly provided to extend upwardly and terminate just beneath the cluster structure 162 of the boys' type frame. Thus, elevation of the plate 426 by the mechanism shown will serve to strip the completely assembled frame out of the various gauging blocks and fixtures comprising the machine, all of these fixtures being first conditioned of course to permit a free upward movement of the frame. This stripper mechanism may be operated hydraulically or pneumatically, as desired.

The operation of the machine is as follows. Clamping block 10 for clamping the head tube 49 is swung out of position by shifting its supporting lever 11 to a position 90 degrees from that shown in Fig. 7. The guide bar 211 is shifted by manually operated lever 212 to its retracted position to the right in Fig. 17. The two head tube gauging plugs 189 and 190 are shifted to their outermost position by operation of the pneumatic piston-cylinder mechanisms. The hydraulic piston-cylinder mechanism 174a is shifted to the outermost position to the right in Figs. 3 and 10. The channel of the guide block 285 is opened by having its hinged closure member 286 swung to open position. The guide blocks 235—238 are open by having the hanger housing clamping slide 220 and the guide closure blocks 236—239 thereon in up position. Thus, the forepart of the machine is conditioned to receive a boy's type sub-assembly comprising the head tube 49 and the two forward reach bars 52—53. The rear clamping mechanisms on slide 310 (Figs. 4 and 5) are in a retracted position to the left of Figs. 4 and 5. Gauging plugs 189—190 are then pneumatically shifted toward each other to fit into the ends of the head tube 49, the inner configurations thereof being such as to act as spacing abutments for the head ends of the tubes 52—53. Clamping lever 11 is then swung about its pivotal mounting to bring clamping block 10 over the head tube 49 whereupon camming lever 12 is manually shifted upwardly to cause its cams 13 to firmly compress clamping block 10 on the head tube 49. This clamp may be omitted when pre-assembly accuracy is available. The hinged guide closure member 286 is then swung to close the channel in guide block 285 where it is secured in non-clamping relation to tube 52. The retractable member 211 is then shifted over tube 52 to the position shown in full lines in Fig. 17. The forward sub-assembly of the frame is then conditioned to be acted upon by the hydraulic slide mechanism 174—174a. The center mast assembly previously has been or now can be positioned in the gauging block 215. The clamping lever 262 (see Figs. 20 and 20A) is then operated as described to bring clamping block 261 upon center mast cluster member 162.

The two rear sub-assemblies are then positioned with the rear axle plates 132 thereof on the contoured clamping blocks 318—319 with the forward free ends of the tubes 130—131 disposed in the channels of the guide blocks 216 and 238. The levers 327 and 331 (see Fig. 5) are then swung clockwise to cause clamping blocks 321 and 321a to firmly clamp the rear axle plates 132 on the respective blocks 318 and 319. The channel of guiding block 260 may then be closed by the hinged closure member 275 (see Fig. 20C whereupon the spacer bar 282 is shifted inwardly to space the free ends of the two upper rear fork tubes relative to the rear branches of the cluster structure 162. The hanger housing is then gauged and clamped through lowering of the clamping slide 220 by pneumatic operation, and by this same action spacer bar 240 is shifted inwardly to space the free ends of the lower rear fork members 131 (note Fig. 23) relative to the radial apertures formed in the hanger housing tube 160. Lowering the slide likewise effects the closing of the channels of the guide blocks 235—238 as explained.

The head tube assembly is then shifted toward the apertures of the center mast cluster 162 and hanger housing 160 by hydraulic operation of slide 198 in the manner described, whereupon the channel guide blocks 235—285 guide the tube into the said apertures in an accurate manner during this press fitting action. The curved tube 52 slides along the top surface of the fixed block 209 and the curvature thereof is followed by the vertical surface of the member 205 by reason of the action of the slide operating member 206, which is fixed to and shiftable with the cross-slide structure carrying the head tube end of the front sub-assembly. The hydraulic press fitting of the ends of the tubes 52—53 to the cluster and hanger housing structure, respectively, continues until the ends of these tubes abut the cylindrical wall of the center mast tube and the gauging surfaces of the plugs 215—219 so that the general longitudinal over-all positions of the tubes 52—53 relative to the final frame assembly will always be substantially predetermined.

The rear hydraulic mechanism 311 is then operated to cause the clamp carrying slide 310 to shift toward the center mast assembly position, thus causing the ends of the upper fork tubes 130 to be moved along the channel of guide block 260 while being subject to the spacing and guiding influence of the spacing and guiding bar 282. In like manner the lower tube ends 131 are guided into the channel block 238, subject to the spacing and guiding influence of slide bar 240 so that the ends of these respective pairs of bars or tubes are accurately presented to the apertures of the branches of the cluster 162 and to the apertures formed in the hanger housing tube 160. Continued operation of the slide 310 advances the tube ends until the ends of the lower tubes 130 encounter the gauging blocks 215—219 in the hanger housing and resistance to the hydraulic pressure stops operation of this mechanism. In the meantime the stabilizing shoes 355—356 are caused to follow the movement of the respective pairs of bars to stabilize these bars and prevent lateral buckling when the same are subjected to compression forces by action of hydraulic cylinder mechanism 340.

The action of slide 310 in the press fitting direction operates cam member 390a to cause the indenting tool 380 to form an indentation in the wall of that branch of the cluster 162 which receives the end of the tube 52, thus mechanically effecting a lock between the branch and tube 52.

The hydraulic pressure is released in the cylinders 174 and 340; the various clamping and gauging mechanisms are then opened; the bars 282, 240 and 211 are retracted; and the pneumatic clamping mechanisms for the head tube and hanger housing tube are then shifted to open position. The rear hydraulic cylinder mechanism 340 is then reversed by operation of the controls to retract the slide 310. The completely assembled frame is now conditioned for removal.

The stripping mechanism, comprising the plate 426 and pins 430, 431 and 432, is then operated by the piston-cylinder mechanism 420 to lift the plate 426, thus causing the upper ends of the pins to act upon the lower perimeter of the hanger housing tube and the under side of the center mast cluster structure to elevate the entire frame whereupon the frame can be shifted endwise to move the head tube end of the frame free of the cross-slide structure. The cross-slide structure may then be retracted by hydraulic operation of the same and the mechanism is then conditioned for the reception of another frame assembly.

The foregoing operation is described with reference to a boy's type bicycle frame. The operation is the same for a girl's type frame with the exception that the additional clamping means 309 for the second cluster structure involved in the girl's type frame is utilized and the second indenting tool 381 serves to effect a mechanical lock between the branch of the second cluster structure and the upper reach bar end.

We claim:

1. The method of manufacturing bicycle frames formed of large and small diameter tubular metal elements having the ends thereof press fitted into bores formed in the large tube walls which comprises effecting four pre-assemblies consisting of a large head tube and smaller front reach bar tubes, a large hanger housing tube and a smaller center mast tube with a center mast tube cluster and the two pairs of small rear fork tubes and rear axle plates, rigidly supporting the second named sub-assembly and movably supporting the other sub-assemblies while forcing the free ends of the tubes of the other sub-assemblies into openings formed in the center mast tube cluster and the hanger housing tube, respectively, and while simultaneously supporting each fork tube during its movement by a traveling transverse action upon the fork tubes intermediate the ends thereof to thereby effect a final press fitted assembly which will withstand expansion and contraction of the frame elements during a simultaneous copper brazing operation wherein the entire frame is subjected to temperatures of from 2000° F. to 2080° F.

2. The method of manufacturing bicycle frames formed of large and small diameter tubular elements having the ends thereof press fitted into bores formed in the large tube walls which comprises effecting four pre-assemblies consisting of a large head tube and front reach bar tubes of smaller diameter, a large hanger housing tube and smaller center mast tube and a center mast tube cluster and the two pairs of small rear fork tubes and rear axle plates, supporting the second named sub-assembly, movably supporting the other sub-assemblies and forcing the free ends of the small tubes of the other sub-assemblies into openings formed in the center mast tube cluster and the hanger housing tube while gauging the opposite pre-assembled ends of the small tubes and during which intermediate portions of some of the movably supported tubes are subjected to a traveling transverse action coincident with the movement of the tubes whereby the final assembly of the various frame elements are preliminarily and sufficiently fastened together at the various joints of the frame structure to remain in such assembled relationship during a subsequent metal expanding and contracting period incident to a simultaneous copper brazing of all the frame joints.

3. The method of manufacturing bicycle frames formed of large and small diameter tubular elements having the ends thereof press fitted into bores formed in the large tube walls which comprises effecting four pre-assemblies consisting of the head tube and front reach bars and the hanger housing and center tube and a center mast tube cluster, the two pairs of rear forks and rear axle plates, rigidly supporting the second named sub-assembly, movably supporting the other sub-assemblies while forcing the free ends of the tubes of the other sub-assemblies into openings formed in the center mast tube cluster and the hanger housing tube while gauging the opposite pre-assembled ends of the small tubes and while simultaneously supporting each fork tube during its movement by a traveling transverse action upon the fork tubes intermediate the ends thereof, and effecting a lock between the mast tube cluster and an upper tube while maintaining said forced actions upon the tube elements and after the gauging actions have been completed.

4. The method of manufacturing bicycle frames formed of large and small diameter tubular elements having the ends thereof press fitted into bores formed in the large tube walls which comprises effecting pre-assemblies consisting of the head tube and front reach bars the hanger housing and center mast tube and center mast tube cluster, the two pairs of rear forks and rear axle plates, placing the respective pre-assemblies in relative position rigidly supporting the second named sub-assembly, simultaneously forcing the free ends of the tubes of the other two sub-assemblies into openings formed in the center mast tube cluster and the hanger housing by simultaneously shifting the fork assemblies and the head assembly toward the mast tube assembly and locking one of the front reach bar tubes to the center mast cluster.

5. The method of manufacturing bicycle frames formed of large and small diameter tubular elements having the ends thereof press fitted into bores formed in the large tube walls which comprises effecting four pre-assemblies consisting of a large head tube and front reach bar tubes of smaller diameter, a large hanger housing tube and smaller center mast tube and a center mast tube cluster, two pairs of small rear fork tubes and rear axle plates, rigidly supporting the second named sub-assembly, movably supporting the other sub-assemblies substantially aligning the free ends of the tubes of the other sub-assemblies with openings of lesser diameter in the elements of the center mast assembly, and forcing the free tube ends into center mast assembly openings formed in the center mast assembly while gauging the opposite pre-assembled ends of the small tubes and while simultaneously supporting each fork tube during its movement by a traveling transverse action upon the fork tubes intermediate the ends thereof whereby the final assembly of the various frame elements are preliminarily and sufficiently press fitted together at the various joints of the frame structure to remain in such assembled relationship during a subsequent metal expanding and contracting period to a simultaneous copper brazing of all the frame joints.

6. The method of manufacturing bicycle frames formed of large and small diameter tubular metal elements having the ends thereof press fitted into bores formed in the large tube walls which includes the steps of pre-assembling ends of upper and lower rear fork tubes with rear-axle plates by fitting ends of the tubes over branches formed on the plates, pre-assembling a center mast tube, a branched cluster and the hanger housing by press fitting the lower end of the mast tube into one of several openings formed in the wall of the hanger housing and press fitting the cluster piece over the mast tube, rigidly supporting the mast tube assembly, positioning and fixing the right and left-hand fork assemblies with the free ends of the upper tubes thereof generally aligned with the cluster branches and the free ends of the lower tubes thereof generally aligned with openings in the hanger housing and effecting simultaneously relative movement between the fork assemblies and the mast tube assembly to produce a simultaneous press fitting of all of the free tube ends of the fork assemblies into the cluster branches and openings in the hanger housing.

7. The method of manufacturing bicycle frames formed of large and small diameter tubular elements having the ends thereof press fitted into bores formed in the large tube walls which comprises effecting pre-assemblies consisting of the head tube and front reach bars the hanger housing and center mast tube and center mast tube cluster, the two pairs of rear forks and rear axle plates, placing the respective pre-assemblies in relative position, planularily supporting the respective sub-assemblies while forcing the free ends of the tubes of certain of the sub-assemblies into openings formed in the center mast tube cluster and the hanger housing of the mast tube sub-assembly by simultaneously effecting relative movement between the two fork assemblies and the head assembly and the mast tube assembly.

8. The method of manufacturing bicycle frames formed of large and small diameter tubular elements having the ends thereof press fitted into bores formed in the large tube walls which comprises effecting four pre-assemblies consisting of a large head tube and front reach bar tubes of smaller diameter, a large hanger housing tube and smaller center mast tube and a center mast tube cluster and the two pairs of small rear fork tubes and rear axle plates, rigidly supporting the center mast sub-assembly and movably supporting the other sub-assemblies with the center lines of the mast tube and the reach bar tubes and the head tube disposed substantially in a common plane and the rear fork tubes symmetrically disposed relative to said plane, the upper ends of the upper fork tubes in a converging movement toward said plane while forcing the free ends of all of the fork tubes into openings formed in the center mast tube cluster and in the hanger housing tube guiding the upper pair and the lower pair of rear fork tubes by a traveling action upon the intermediate portions of the fork tubes to prevent the tubes of the forks from spreading during the longitudinal passing action thereon whereby the final assembly of the various frame elements are preliminarily and sufficiently fastened together at the various joints of the frame structure to remain in such assembled relationship during a subsequent metal expanding and contracting period incident to a simultaneous copper brazing of all the frame joints.

HERMAN L. KRAEFT.
LEONARD J. WALTERS.
RUDOLPH F. SKERL.

REFERENCES CITED

The following references are of record in the file of this patent:

UNITED STATES PATENTS

| Number | Name | Date |
|---|---|---|
| 548,165 | Lavender | Oct. 15, 1895 |
| 602,844 | Felsche | Apr. 26, 1898 |
| 1,480,777 | Meiselbach | Jan. 15, 1924 |
| 1,998,994 | Lewis | Apr. 23, 1935 |
| 2,148,423 | Blettner | Feb. 28, 1939 |
| 2,158,075 | Loftfield | May 16, 1939 |
| 2,209,709 | Weatherhead | July 30, 1940 |
| 2,435,448 | Kraeft et al. | Feb. 3, 1948 |
| 2,443,008 | Kraeft et al. | June 8, 1948 |

FOREIGN PATENTS

| Number | Country | Date |
|---|---|---|
| 456,503 | Germany | Oct. 2, 1925 |

OTHER REFERENCES

The Weld. Encyclo. 11th ed., 1943, The Weld. Eng. Pub. Co., Chicago, Ill.

Product Eng., Oct. 1946, pp. 103–107.

The Weld. Journal, Apr. 1946, p. 242–S to 249–S.